Jan. 17, 1928.

K. HEEGNER 1,656,195

ARRANGEMENT FOR THE GENERATION OF OSCILLATIONS

Filed Oct. 23, 1925

INVENTOR
KURT HEEGNER

BY
ATTORNEY

Patented Jan. 17, 1928.

1,656,195

UNITED STATES PATENT OFFICE.

KURT HEEGNER, OF BERLIN, GERMANY, ASSIGNOR TO GESELLSCHAFT FÜR DRAHT-LOSE TELEGRAPHIE M. B. H. HALLESCHES UFER, OF BERLIN, GERMANY, A CORPORATION OF GERMANY.

ARRANGEMENT FOR THE GENERATION OF OSCILLATIONS.

Application filed October 23, 1925, Serial No. 64,322, and in Germany October 31, 1924.

The present invention covers an arrangement adapted to the production of oscillations, and the same is based upon the principle that in oscillation circuits which are intercoupled through iron-cored choke coils, oscillations may arise at a frequency which bears a certain linear relationship to the natural frequency of the oscillation circuit when the magnetization of the iron core or iron cores is effected. Now, in accordance with this invention, two alternating current magnetized iron cores are so interconnected by a winding that at this winding no idle (no-load) voltages are induced, and that this winding is inserted in an oscillation circuit which is tuned to the fundamental wave or a higher harmonic of the alternating current.

The invention will be better understood from the following description when considered in connection with the accompanying drawing on which:

Figure 1:
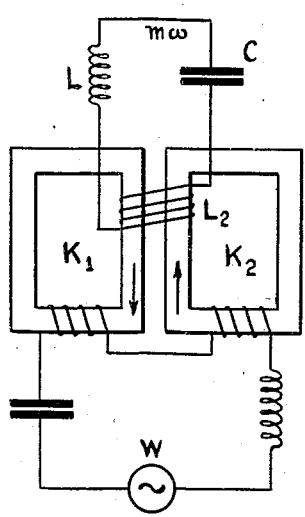
Fig. 1 is a diagrammatic view of one embodiment of the invention.

Referring to Fig. 1 two iron-cores $K_1$ $K_2$ are oppositely magnetized by an alternating current having a frequency $w$. The iron-cores are embraced by a common or joint winding $L_2$ so that the direction of magnetization is in opposite directions as indicated by the arrows. The disposition of the winding $L_2$ is so chosen that no voltages of the fundamental frequency $w$ are produced. The windings $L_2$ are closed by way of a coil $L$ and a capacitance $C$, and the entire circuit is tuned to an oscillation the frequency of which is equal to $mw$, where $m$ is the relationship between the frequency of the circuit in which oscillations are excited, and the frequency of the alternating current. In case of higher frequency raising, also an auxiliary circuit could be used which would be tuned to a lower period, and which is caused to vibrate at a frequency which is equal to its natural period.

Figure 2:
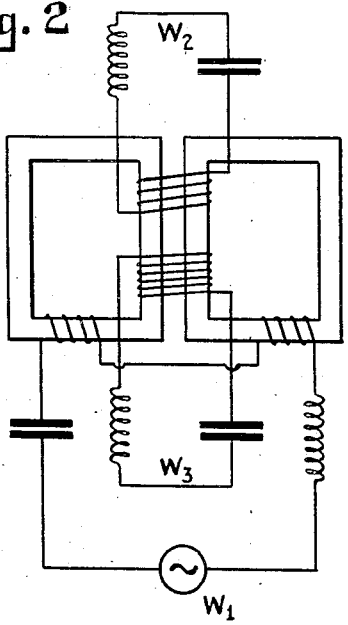
Fig. 2 is a modification of the form shown in Fig. 1.

This case in which two auxiliary circuits are used which are tuned to frequencies $w_2$ and $w_3$, while the impressed frequency is $w_1$, is illustrated in Fig. 2. Theoretical and experimental investigation has shown that the sum total of the frequencies of the two auxiliary circuits $w_2$ and $w_3$ bear a linear relationship to the impressed frequency $w_1$. For instance, the relation $2w_1 = w_2 + w_3$ is fulfilled. As a consequence, it is possible by detuning one of said auxiliary circuits and convenient tuning of the second auxiliary circuit, to set up in the latter any desired frequency. In an arrangement according to Fig. 2 the relation is such that the sum of the natural frequencies of both auxiliary circuits is equal to an even multiple of the machine frequency.

The embodiment of the invention illustrated and described herein has been selected for the purpose of clearly setting forth the principles involved. It will be apparent, however, that the invention is susceptible of being further modified to meet the different conditions encountered in its use and I therefore aim to cover by the appended claims all modifications within the true spirit and scope of this invention.

What I claim as new and desire to secure by Letters Patent of the United States is:

1. In a system of the character described the combination of an alternating current source having a fundamental frequency and means to generate the higher harmonics of said source comprising, two iron cores adapted to be oppositely magnetized by said alternating current, a coil wound about said cores, and a circuit tuned to the desired harmonic connected to said coil.

2. In a system of the character described the combination of an alternating current source having a fundamental frequency and means to generate the higher harmonics of said source comprising, two iron cores adapted to be oppositely magnetized by said alternating current, two circuits each of which includes a single coil wound on said iron cores and means for tuning said circuits, whereby the desired frequency is generated in one thereof.

3. In a frequency changer two oppositely magnetized iron cores, two windings each embracing both said cores, two independently operating tuning circuits each connected to one of the windings, means comprising one of said tuning circuits for controlling the frequency of the other.

KURT HEEGNER.